United States Patent
Semple et al.

(10) Patent No.: US 6,702,365 B2
(45) Date of Patent: Mar. 9, 2004

(54) TORSIONAL ISOLATED PICKUP TRUCK CARGO BED

(75) Inventors: Calum Semple, Toronto (CA); Noel Mack, Lakeshore (CA)

(73) Assignee: Steyr Symatec LLC, Troy, MI (US)

( * ) Notice: Subject to any disclaimer, the term of this patent is extended or adjusted under 35 U.S.C. 154(b) by 0 days.

(21) Appl. No.: 10/150,530

(22) Filed: May 17, 2002

(65) Prior Publication Data

US 2003/0001409 A1 Jan. 2, 2003

Related U.S. Application Data

(60) Provisional application No. 60/291,699, filed on May 17, 2001.

(51) Int. Cl.⁷ .............................................. B62D 33/02
(52) U.S. Cl. ....................................... 296/183; 296/204
(58) Field of Search ................................ 296/183, 204

(56) References Cited

U.S. PATENT DOCUMENTS

| | | | |
|---|---|---|---|
| 1,322,887 A | * 11/1919 | Field | ........................... 296/204 |
| 2,616,754 A | 11/1952 | Stahl | |
| 2,945,721 A | 7/1960 | Chaney | |
| 3,481,643 A | * 12/1969 | Campbell | .................... 296/204 |
| 5,188,418 A | 2/1993 | Walworth, Jr. et al. | |
| 5,511,848 A | 4/1996 | Mobley | |
| 5,544,932 A | 8/1996 | Walworth, Jr. et al. | |
| 5,575,525 A | 11/1996 | Walworth, Jr. et al. | |
| 5,632,509 A | 5/1997 | Reichert | |
| 5,660,427 A | 8/1997 | Freeman et al. | |
| 5,690,378 A | 11/1997 | Romesburg | |
| 5,730,486 A | 3/1998 | Jurica | |
| 5,938,272 A | 8/1999 | Jurica et al. | |
| 6,170,905 B1 | 1/2001 | Jurica | |
| 2001/0039712 A1 | 11/2001 | Ruehl et al. | |

FOREIGN PATENT DOCUMENTS

| | | | |
|---|---|---|---|
| GB | 491966 | * 12/1928 | ................. 296/183 |
| RU | D3858A/17 | * 5/1977 | |

* cited by examiner

*Primary Examiner*—Dennis H. Pedder
(74) *Attorney, Agent, or Firm*—Clark Hill PLC

(57) ABSTRACT

The present invention relates to a cargo bed assembly secured to and supported by a chassis of a motor vehicle. The cargo bed assembly includes a base that extends between a front end and a back end. The cargo bed assembly also includes a back support extending across the back end between a first end and a second end. Each of the first and second ends is fixedly secured to the chassis. A plurality of sidewalls is fixedly secured to the base and each is perpendicular thereto. The cargo bed assembly includes a brace that is fixedly secured to the chassis. The brace is movably secured to the base to absorb torsional forces by twisting as the chassis transmits torsional forces to prevent the cargo bed assembly from bending and flexing due to torsional force received by the chassis.

7 Claims, 3 Drawing Sheets

TORSIONAL ISOLATED PICKUP TRUCK CARGO BED

This application claims the benefit of Provisional application Ser. No. 60/291,699, filed May 17, 2001.

FIELD OF THE INVENTION

The subject invention relates to a motor vehicle cargo bed and, more specifically, to the cargo bed assembly of a pickup truck that is isolated from torsional loading by the pickup truck's frame structure so as to prevent twisting of the sides of the cargo bed assembly in relation to each other.

BACKGROUND OF THE INVENTION

Pickup truck cargo beds are generally fixedly secured along the length of the vehicle frame which comprise two generally parallel frame members interconnected and spaced apart by cross members to create what is commonly known as a ladder frame. The cargo bed is generally fixedly secured to these frame members, such as by welds or bolts. The frame members have some movement in relation to each other, thus causing the cargo bed, which is fixedly secured thereto, to move with the frame members. This movement of the cargo bed frustrates the use of dual, side opening doors by causing tolerance and alignment difficulties and may cause the damages to the truck cab due to contact with the moving cargo bed.

U.S. Pat. No. 5,632,509, issued to Reichert on May 27, 1997, discloses a truck having a chassis and an intermediate frame. A three-point frame is used to allow non-torsional bodies to be secured to the torsional chassis. The three-point frame includes two points that slide laterally and longitudinally to alleviate torsional forces. This disclosure describes a system that is deficient because it does not allow for large torsional forces to be overcome by the frame and it requires springs to allow for movement of the cargo bed with respect to the frame.

SUMMARY OF THE INVENTION

The present invention relates to a cargo bed assembly secured to and supported by a chassis of a motor vehicle. The cargo bed assembly includes a base that extends between a front end and a back end. The cargo bed assembly also includes at least one back support extending across the back end between a first end and a second end. The at least one back support is fixedly secured to the chassis. A plurality of sidewalls is fixedly secured to the base and each is perpendicular thereto. First and second parallel and spaced apart spines are fixedly secured to the at least one back support and extend toward the front end of the base. Each of the spines includes a top surface and opposing outer walls extending downwardly therefrom. Each of the spines also includes a bottom surface extending outwardly from each of the opposing outer walls, and an upwardly extending flange extending from each of the bottom surfaces. An inner body panel covers the base and the plurality of sidewalls. The inner body panel includes a bed resting upon the top surface of each of the first and second spines. The cargo bed assembly includes a brace that is fixedly secured to the chassis. The brace supports the base and extends transversely to the first and second spines. The brace includes an upwardly open channel section defined by front and back walls. The brace also includes a horizontal segment extending outwardly from each of the front and back walls, and downwardly extending flange extending from each of the horizontal segments to absorb torsional forces by twisting as the chassis transmits torsional forces to prevent the cargo bed assembly from bending and flexing due to torsional force received by the chassis.

DESCRIPTION OF THE DRAWINGS

Advantages of the invention will be readily appreciated as the same becomes better understood by reference to the following detailed description when considered in connection with the accompanying drawings, wherein.

DESCRIPTION OF THE INVENTION

Figure 1:
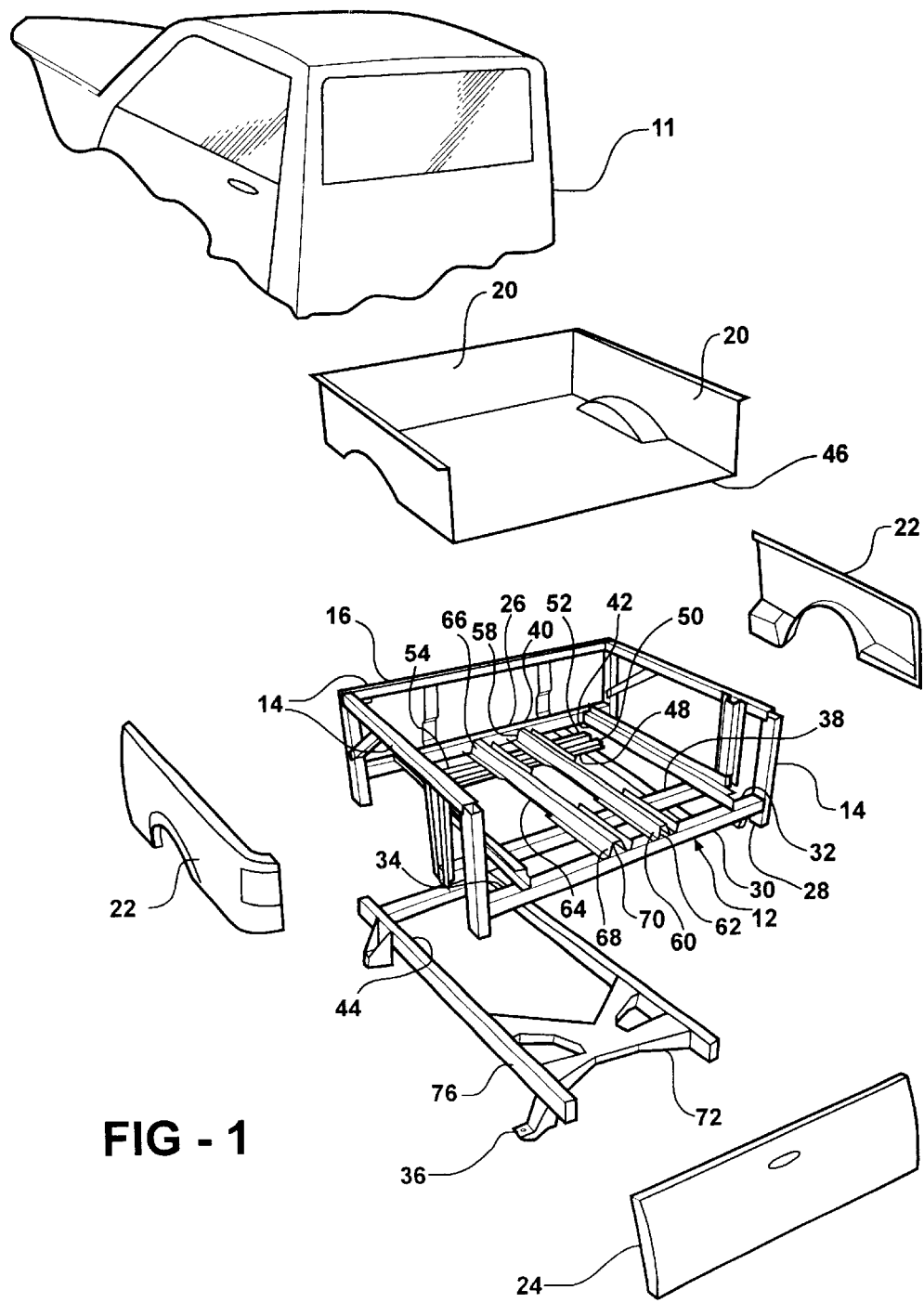
FIG. 1 is an exploded perspective view of one embodiment of the invention.
Figure 2:
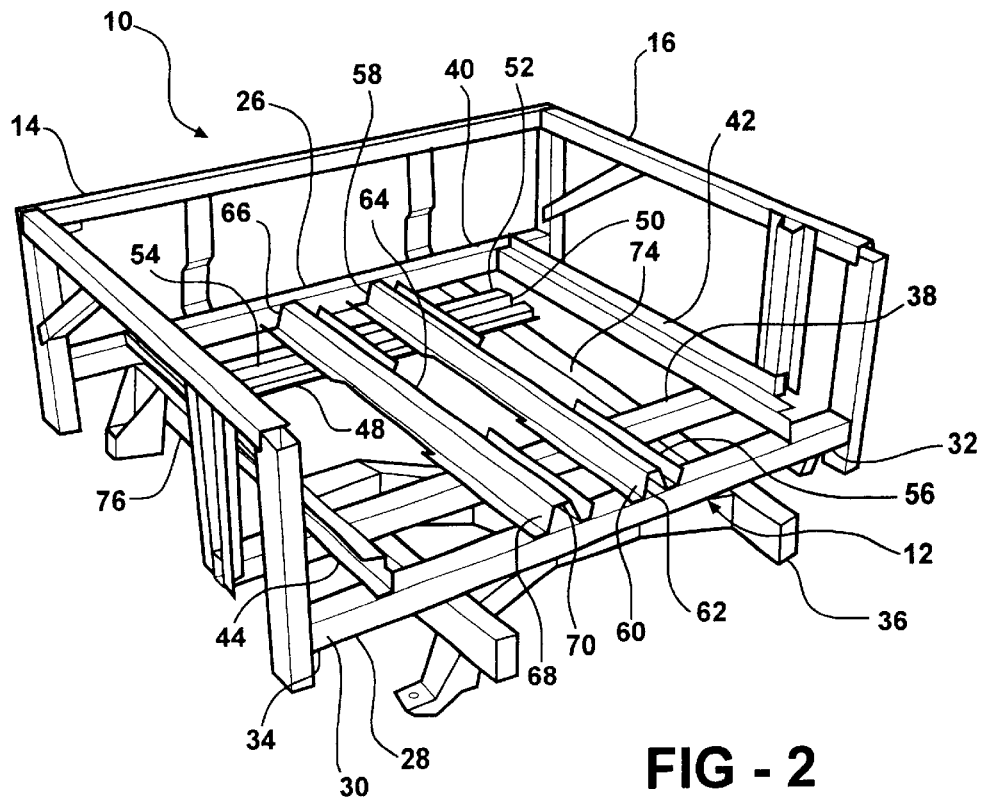
FIG. 2 is a perspective view of one embodiment of the invention with the sheet metal and fenders removed.
Figure 3:
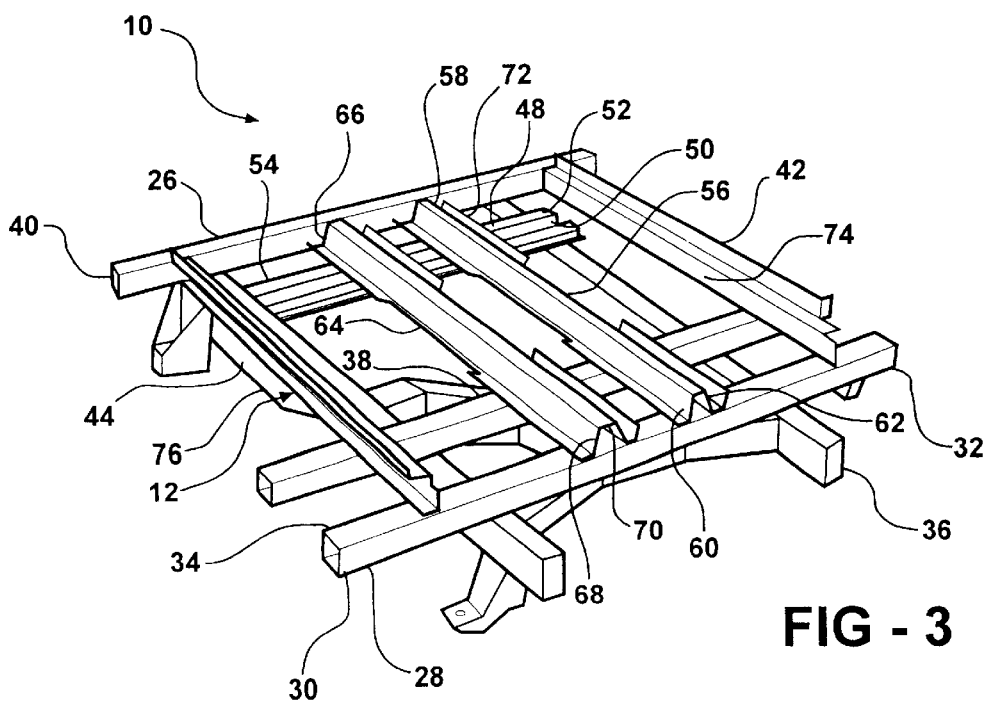
FIG. 3 is a perspective view of one embodiment of the invention with the sidewalls removed.
Figure 4:
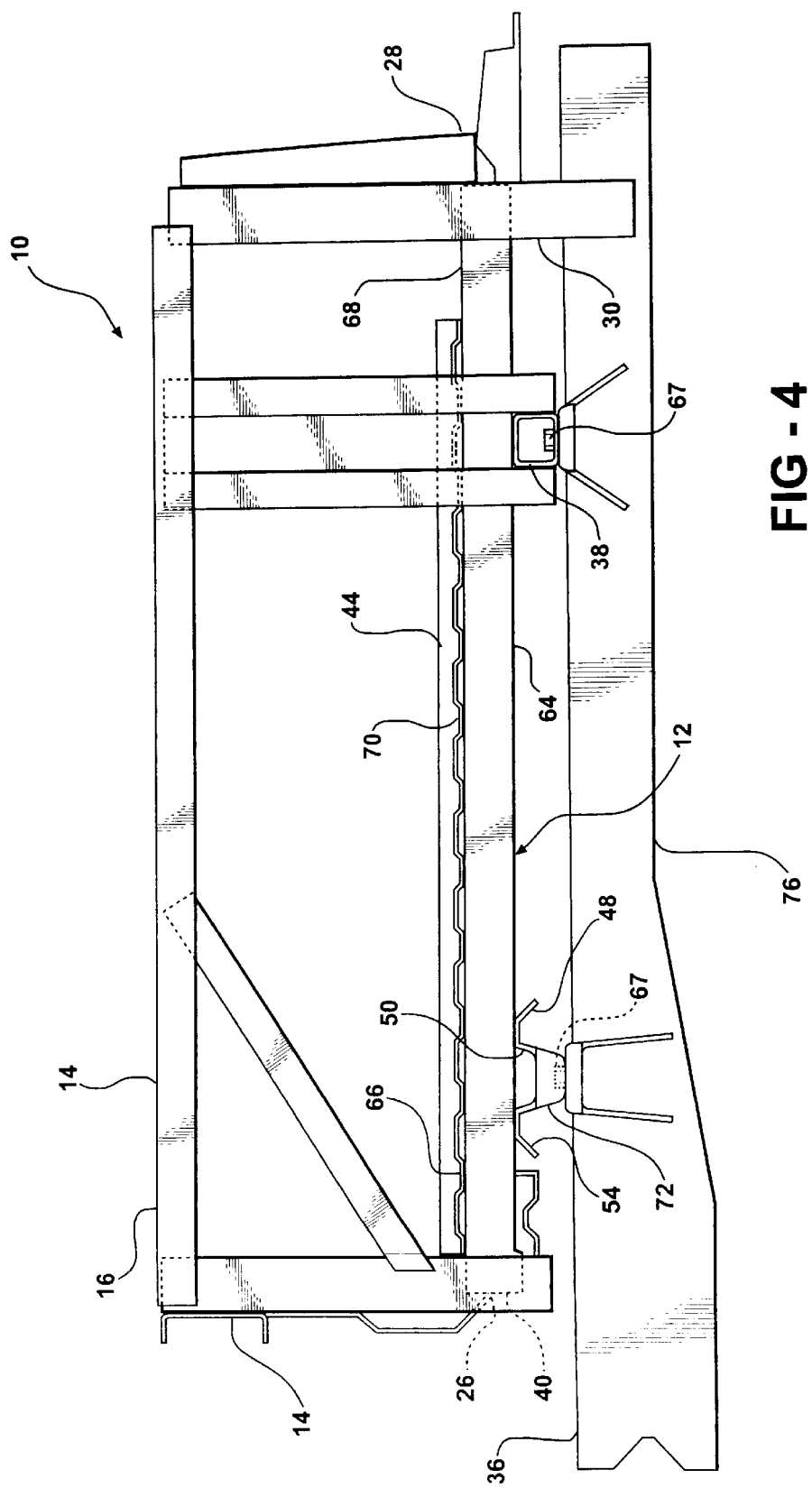
FIG. 4 is a cross-sectional side view of one embodiment of the invention.

Referring to FIG. 1, a cargo bed assembly for a motor vehicle 11 is generally shown at 10. While the invention may be incorporated into any type of motor vehicle having a cargo bed disparate from a passenger compartment, the cargo bed assembly 10 shown is designed to be incorporated into a pickup truck.

The cargo bed assembly 10 is generally used for storing and/or hauling cargo. The cargo bed assembly 10 includes a base, generally indicated at 12, and a plurality of sidewalls 14. Each of the plurality of sidewalls 14 is fixedly secured to the base 12 and extend upwardly therefrom perpendicular thereto. As is shown in FIG. 1, three sidewalls 14 extend around three sides of the base 12. The three sidewalls 14 are of equal height and a top edge 16 of each of the sidewalls 14 together define a plane 18 that is parallel to the base 12.

Covering the base 12 and sidewalls 14 are an inner body panel (or liner) 20 and outer side body panels 22. These may be formed of sheet metal or some other material such as a thermoset plastic. One or more doors 24 are used to create the fourth side of the cargo bed assembly 10. The door 24 is hingedly secured to a part of the cargo bed assembly 10 and may move between a closed position and an open position. While not shown, a tonneau cover may extend through the plane 18 to cover the cargo bed assembly 10. Hard tonneau covers are also hingedly secured to the cargo bed assembly 10 and move between a closed and an open position.

The base 12 extends between a front end 26 and a back end 28. For purposes of discussion, the front end 26 will be the end of the base 12 that has a sidewall 14 extending thereacross whereas the back end 28 is the end of the base 12 that the door 24 extends thereacross. It should be appreciated by those skilled in the art that the orientation of front and back ends 26, 28 may be reversed without adding to the inventive concept.

The base 12 includes a back support 30 extending across the back end 28. The back support 30 extends between a first end 32 and a second end 34. The back support 30 is fixedly secured to a chassis 36 of the motor vehicle adjacent each of the two ends 32, 34, which are shown slightly cantilevered therefrom. The back support 30 is secured to the chassis 36 using bolts 67. It is appreciated that the back support 30 may also be secured to the chassis 36 by welding or any other fastening means known in the art to operate sufficiently in the motor vehicle environment. A second back support 38 extends across the back end 28 parallel to the back support 30 and is secured to the chassis 36 in a manner similar to the back support 30. It should be appreciated by those skilled in the art that any number of back supports 30, 38 may be incorporated into the cargo bed assembly 10.

Extending across the front end 26 of the base 12 is a front support 40. The front support extends between two sidewalls 14 and provides support for a third sidewall 14 connecting the two parallel sidewalls 14. The base 12 also includes side supports 42, 44 that extend between the back supports 30, 38 and the front support 40. In the embodiment shown, the side supports 42, 44 abut the front support 40 and extend over the back supports 30, 38. A bed (and/or bed liner) 46 lays over and is secured to the side supports 42, 44. The bed 46 extends between all of the sidewalls 14. All of the supports 30, 38, 40, 42, 44 are tubular in design and have a rectangular cross section.

A brace 48 extends transversely across the base 12 below the bed 46. The brace 48 supports the base 12. The brace 48 includes an upwardly open channel section 50 defined by front and back walls. The brace 48 further includes a horizontal segment extending outwardly from each of the front and back walls. A downwardly extending flange extends from each of the horizontal segments. While the brace 48 extends perpendicularly to the side supports 42, 44, it does not extend to the side supports 42, 44. More specifically, the brace 48 extends between first 52 and second 54 brace ends. Neither of the brace ends 52, 54 extend to the side supports 42, 44. Instead, the brace ends 52, 54 are fixedly secured to the chassis 36 at a location interior of the side supports 42, 44.

The cargo bed assembly 10 also includes a spine 56, which extends parallel to the side supports 42, 44. The spine 56 extends between a front spine end 58 and a back spine end 60. The back spine end 60 rests on and is fixedly secured to the back supports 30, 38. The spine 56 is corrugated and includes a top surface 62 upon which the bed 46 rests. Therefore, the spine 56 provides additional support for the bed 46 when loads are placed on the bed 46. The bed 46 is fastened to the top surface 62 of the spine 56. In the embodiment shown in the Figures, the cargo bed assembly 10 includes two spines 56, 64, wherein the second spine 64 is parallel to the first spine 56. Like the first spine 56, the second spine 64 includes a top surface 70 to which the bed 46 is secured. Each of the spines 56, 64 includes opposing outer walls extending downwardly from each top surface 62, 70. Each of the spines 56, 64 also includes a bottom surface extending outwardly from each of the opposing outer walls and an upwardly extending flange extending from each of the bottom surfaces.

The front spine ends 58, 66 engage the brace 48. More specifically, the front spine ends 58, 66 extend over and are supported by the brace 48. This is a third support point 72 for the cargo bed assembly 10 with the first two being the points at which the back support 30 is fixedly secured to the chassis 36. The spines 56, 64 and the brace 48 are designed to flex and twist to maintain the cargo bed assembly 10 true while the chassis 36 flexes and absorbs torsional forces. Because the brace 48 and the spines 56, 64 are perpendicular to each other, each absorbs torsional forces in a different direction or about a different axis. Torsion occurs when two frame rails 74, 76 of the chassis 36 move out of a plane that is parallel to the bed 46 and the plane 18 of the top edges 16. When this occurs, the spines 56, 64 twist allowing the chassis 36 to accept torsional forces without transferring them to the cargo bed assembly 10. The cargo bed assembly 10 does not flex with the chassis 36 and remains static and true.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A cargo bed assembly secured to and supported by a chassis of a motor vehicle, said cargo bed assembly comprising:

a base extending between a front end and a back end and including at least one back support extending across said back end between a first end and a second end wherein said at least one back support is fixedly secured to the chassis;

a plurality of sidewalls fixedly secured to said base and perpendicular thereto;

first and second parallel and spaced apart spines fixedly secured to said at least one back support and extending toward said front end of said base, each of said spines including a top surface and opposing outer walls extending downwardly therefrom, each of said spines further including a bottom surface extending outwardly from each of said opposing outer walls and an upwardly extending flange extending from each of said bottom surfaces;

an inner body panel covering said base and said plurality of sidewalls, said inner body panel including a bed resting upon said top surface of each of said first and second spines; and a brace extending between first and second brace ends fixedly secured to the chassis and supporting said base, said brace extending transversely to said first and second spines and including an unwardly open channel section defined by front and back walls, said brace further including a horizontal segment extending outwardly from each of said front and back walls and a downwardly extending flange extending from each of said horizontal segments for absorbing torsional forces received from the chassis to reduce bending and flexing at said cargo bed assembly.

2. A cargo bed assembly as set forth in claim 1 wherein two of said plurality of sidewalls are fixedly secured to a front support and said at least one back support.

3. A cargo bed assembly as set forth in claim 2 including a second back support extending across said base parallel to and spaced apart from said at least one back support.

4. A cargo bed assembly secured to and supported by a chassis of a motor vehicle, said cargo bed assembly comprising:

a base extending between a front end and a back end and including at least one back support extending across said back end between a first end and a second end wherein said at least one back support is fixedly secured to the chassis;

a plurality of sidewalls fixedly secured to said base and perpendicular thereto;

a plurality of spines fixedly secured to said at least one back support and extending parallel to each other toward said front end of said base, each of said plurality of spines including a top surface and outer walls extending downwardly therefrom, each of said plurality of spines further including a bottom surface extending outwardly from each of said opposing outer walls and an upwardly extending flange extending from each of said bottom surfaces;

an inner body panel covering said base and said plurality of sidewalls, said inner body panel including a bed resting upon said top surface of each of said plurality of spines; and a brace extending between first and second brace ends each fixedly secured to the chassis and including an upwardly open channel section defined by front and back walls, said brace further including a horizontal segment extending outwardly from each of said front and back walls and a downwardly extending flange extending from each of said horizontal segments for absorbing torsional forces in a first direction received from the chassis to reduce bending and flexing of said cargo bed assembly.

5. A cargo bed assembly as set forth in claim 4 wherein two of said plurality of sidewalls are fixedly secured to a front support and said at least one back support.

6. A cargo bed assembly as set forth in claim 5 including a second back support extending across said base parallel to and spaced apart from said at least one back support.

7. A cargo bed assembly as set forth in claim 6 wherein said brace extends transversely to said plurality of spines.

* * * * *